Patented Jan. 2, 1923.

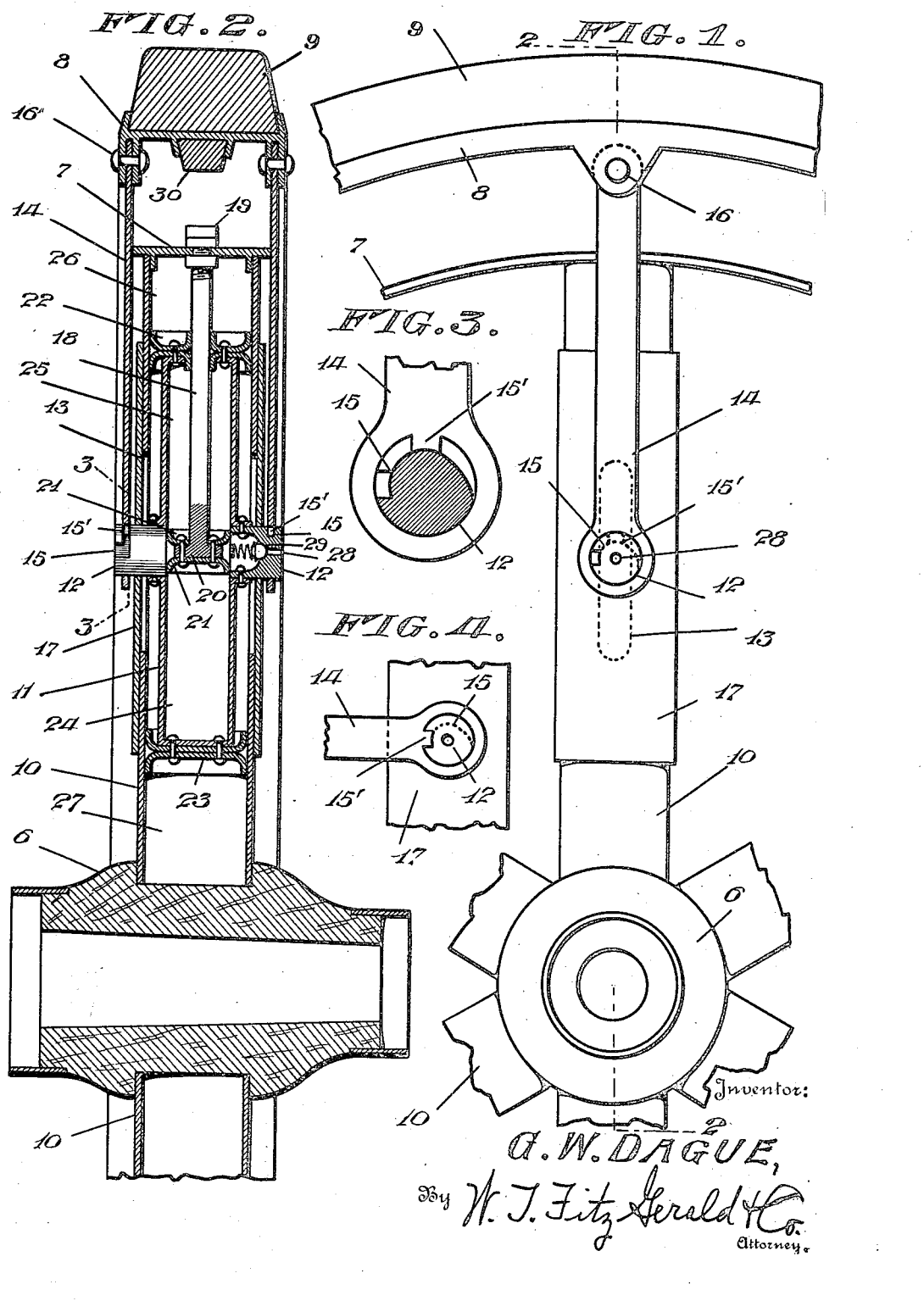

1,440,819

UNITED STATES PATENT OFFICE.

GEORGE W. DAGUE, OF GLENMORA, LOUISIANA.

VEHICLE WHEEL.

Application filed March 3, 1922. Serial No. 540,750.

*To all whom it may concern:*

Be it known that I, GEORGE W. DAGUE, a citizen of the United States, residing at Glenmora, in the parish of Rapides and State of Louisiana, have invented certain new and useful Improvements in Vehicle Wheels; and I do hereby declare the following to be a full, clear, and exact description of the invention, such as will enable others skilled in the art to which it appertains to make and use the same.

The present invention relates to vehicle wheels, and is particularly an improvement over the vehicle wheel disclosed in my Patent No. 1,335,939, granted April 6, 1920.

The invention has for its object the improvement of the pneumatic cushioning means associated with each spoke, whereby to enhance the utility and efficiency of the structure.

A further object is the provision of such a novel and improved construction provided with air cushions therein, for absorbing the shocks between the rim and hub, so that the hub floats on air to afford an easy riding wheel, without the necessity of using pneumatic tires which are subject to punctures and blow-outs.

A further object is the provision of a plunger movable along or within the spoke with the rim and providing air cushion chambers, and a novel arrangement for the inlet of air into said chambers whereby the air will be accumulated therein and brought under pressure to provide the desired cushioning action.

A further object is the provision in such a structure of a novel combination of the spoke, plunger movable with the rim, and a plunger or piston movable with the felly and spoke, whereby an effective cushioning means is provided.

Another object is the provision of means for the attachment of one end of each of the links without separate securing means therefor.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a side elevation showing one complete spoke, and the others and major portions of the rim and felly broken away.

Fig. 2 is a longitudinal section of one spoke construction, taken on the line 2—2 of Fig. 1, and showing the hub, rim, tire and other parts in section and other portions in elevation.

Fig. 3 is an enlarged sectional detail on the line 3—3 of Fig. 2.

Fig. 4 is a detail view showing the position of a link when attaching same to the stud.

The wheel comprises any suitable hub 6, a felly 7 of metal or other suitable construction, and a rim 8 surrounding and spaced from the felly and preferably although not necessarily provided with a solid tire 9 thereon of rubber, composition or other suitable material. The spokes 10 which are secured at their inner and outer ends to the hub 6 and felly 7, respectively, are tubular, and the felly is rigid with the hub, while the rim 8 is movable in the plane of the wheel relatively to the hub, spokes and felly.

Disposed for longitudinal sliding movement within each spoke 10, is an elongated hollow or tubular plunger 11, and studs or trunnions 12 are riveted or otherwise in bosses on the opposite sides of the plunger 11 between the ends thereof and said studs project outwardly through longitudinal slots 13 in opposite sides of the spoke 10. Links 14 have their inner ends pivotally mounted on the studs 12 and their outer ends are pivotally connected, as at 16, to the rim 8. In order to pivotally fasten the links to the studs 12 without nuts, pins or other separate securing means, each stud has a bayonet or L-shaped slot 15 therein with the entrance end extending to the end of the stud and the tail of the slot disposed transversely of the stud, and the inner end of the corresponding link has a lug 15' projecting into the opening of the link in which the stud is disposed. The arrangement is such that when the link is disposed at substantially right angles with the spoke, as seen in Fig. 4, the end of the link can be slipped over the stud with the lug 15' entering the slot 15, and when the link has been slid on the stud into proper position, the link is swung outwardly and the lug 15' moves into the tail or transverse portion of the slot, thereby locking the link on the stud against movement off of the stud, although the link can oscillate. When the outer end of the link is pivotally connected to the rim 8, there is no liability of the link becoming detached from the stud, and this avoids the use of a special securing member on each stud. The links 14 are disposed at the opposite sides of the wheel and extend across the edges of the felly 7. Said links connect the rim with the body of the wheel, and permit the rim and body to move in various directions in the plane of the wheel a limited amount, but prevent relative lateral displacement of the parts. The plungers 11 being connected by the links 14 with the rim 8, will be reciprocated within the spokes 10 due to the relative movement between the felly 7 and rim 8.

In order to exclude dust, dirt and foreign matter, sleeves 17 are slidable on the spokes 10 to cover the slots 13, and the studs 12 extend through said sleeves whereby the sleeves move with said studs and plungers 11.

A rod 18 is disposed within each spoke, and has its outer end secured by means of nuts 19, or the like, to the felly 7, and said rod extends inwardly and is provided substantially midway between the ends of the spoke with a piston or plunger 20, having the packing 21 engaging the walls of the plunger 11 on the interior thereof, whereby to prevent leakage of air past said piston within the plunger in which the piston works. Packing 22 is also secured to the outer end of the plunger 11 and contacts with the inner surface of the spoke 10 and the rod 18, to prevent leakage along the wall of the spoke and along the rod 18, and packing 23 is secured to the inner end of the plunger and contacts with the inner surface of the spoke. Thus, four enclosed air cushion chambers are provided within the spoke, namely, one chamber 24 between the piston and inner end of the plunger, a second chamber 25 between said piston 20 and outer end of the plunger 11 and packing 22, a third chamber 26 between the outer end of the spoke 10 and the outer end of the plunger 11 and packing 22, and a fourth chamber 27 between the inner end of the spoke and the inner end of the plunger 11 and packing 23. These chambers are enlarged or elongated or contracted as the plunger 11 and spoke 10 reciprocate relatively to one another, whereby to provide the cushioning action.

In order to render the cushions more effective, means is provided for admitting air. Thus, the studs or trunnions 12 have air inlet ports 28 leading from the atmosphere to the interior of the plunger 11, and so arranged that the ports 28 move to the opposite sides of the piston 20 as the parts reciprocate relatively to one another. Check valves 29 of any suitable kind are provided within the ports 28, to prevent the escape of air, thereby trapping it within the chambers 24 and 25.

It is also preferable to provide rubber or similar buffers 30 on the inner periphery of the rim 8 for the contact of the outer ends of the rods 18, should the movement of the parts be excessive, such as when the air pressure is low after the wheel has been at a standstill for a period of time.

As the wheel rotates and is subjected to jars and shocks, the body of the wheel including the hub 6, spokes 10 and felly 7 will move relatively to the rim 8, thereby reciprocating the plungers 11 and spokes 10 relatively to one another. When the plunger 11 of a spoke and the hub move toward one another, this compresses the air in the chambers 25 and 27 and when said hub and plunger separate, this compresses the air in the chambers 24 and 25. Furthermore, when the hub 6 and plunger move toward one another, the ports 28 are moved inwardly past the piston 20, thereby communicating with the chamber 24, and as said chamber is enlarged, air is drawn from the atmosphere through the ports 28 into said chamber 24. This air is trapped within the chamber 24, inasmuch as it cannot escape, and increases the pressure therein when the plunger 11 and hub 6 separate and when this separation moves the ports 28 past the piston 20, they communicate with the chamber 25, thereby causing air to be drawn into said chamber 25 in the same way from the atmosphere. In this manner, when the plunger 11 and piston or plunger rod 18 reciprocate relatively to one another, the ports 28 are alternately brought into communication with the chambers 24 and 25, and the air is thus drawn into and accumulated within said chambers to increase the pressure therein, both to make up for any leakage of air and to also enhance the cushioning effect.

Having thus described the invention, what is claimed as new is:—

1. A vehicle wheel comprising a hub, tubular spokes secured thereto, a rim, hollow plungers slidable within the spokes, pistons movable with the spokes and working within said plungers to provide air chambers between the ends of the plungers and pistons, and means connecting said plungers and rim, said plungers having air inlets for the entrance of air into said chambers at the opposite sides of said pistons.

2. A vehicle wheel comprising a hub, spokes secured thereto, a rim, plungers slidable within the spokes and providing air chambers, studs having air inlets carried by the plungers for said chambers and check valves, and means connecting said studs and rim.

3. A vehicle wheel comprising a hub, tubular spokes secured thereto, a rim, hollow plungers slidable within the spokes, pistons movable with the spokes and working within said plungers, and means connecting said plungers and rim, said plungers having air inlets, said air inlets and pistons being so arranged that the pistons move past said air inlets for the entrance of air alternately into the plungers at opposite sides of the pistons.

4. A vehicle wheel comprising a hub, tubular spokes secured thereto, a rim, hollow plungers slidable within the spokes and having packings at their opposite ends contacting with the spokes to provide air chambers between the ends of the spokes and plungers, pistons movable with the spokes and working in the plungers between the ends thereof to provide air chambers between the pistons and ends of the plungers, the plungers having air inlets for the last named air chambers, and said pistons being movable to opposite sides of said air inlets for the entrance of air into the last named chambers alternately at opposite sides of the pistons.

5. A vehicle wheel comprising a hub, tubular spokes, a felly secured to the spokes, a rim surrounding the felly, hollow plungers working in said spokes, the spokes having longitudinal slots, studs carried by the plungers working in said slots, links connecting said studs and rim, rods secured to the felly within the spokes and having pistons within said plungers, packing between said plungers and said rods and spokes, said studs having air inlets, said pistons being movable past said air inlets to opposite sides thereof for the entrance of air into the plungers alternately at opposite sides of the pistons, and said air inlets having check valves.

6. A vehicle wheel comprising a hub, a rim, a yieldable plunger movable towards and away from the hub and having a stud with a bayonet slot, and a link fitted on said stud and having a lug in said slot to retain the link on the stud, said link being pivotally connected with the rim.

7. A vehicle wheel comprising two relatively movable yieldable parts, and links for connecting said parts, each link and one of said parts having portions to be fitted together when the link is disposed at an angle to its normal position and to lock the link in place when turned to normal position and connected to the other part.

8. A vehicle wheel comprising two relatively movable yieldable parts, studs carried by one of said parts and having bayonet slots, and links fitted on said studs and pivotally connected to the other part, said links having lugs engaging in said slots to retain them on the studs.

In testimony whereof I have signed my name to this specification in the presence of two subscribing witnesses.

GEORGE W. DAGUE.

Witnesses:
 B. E. LURDLEY,
 F. A. CHAINLAIN.